United States Patent
Shiao

(10) Patent No.: US 7,425,768 B1
(45) Date of Patent: Sep. 16, 2008

(54) POWER-GENERATING MAGNETIC SENSING EQUIPMENT

(75) Inventor: Chih-Mao Shiao, Taichung (TW)

(73) Assignee: Hiwin Mikrosystem Corp., Taichung (TW)

( * ) Notice: Subject to any disclaimer, the term of this patent is extended or adjusted under 35 U.S.C. 154(b) by 0 days.

(21) Appl. No.: 11/936,783

(22) Filed: Nov. 7, 2007

(51) Int. Cl.
*H02K 41/00* (2006.01)

(52) U.S. Cl. ...................................... 290/1 R
(58) Field of Classification Search .................... 290/1 R
See application file for complete search history.

(56) References Cited

U.S. PATENT DOCUMENTS

| | | | | |
|---|---|---|---|---|
| 4,570,349 A | * | 2/1986 | Finkelman et al. | 33/784 |
| 4,663,588 A | * | 5/1987 | Himuro et al. | 324/207.13 |
| 4,952,874 A | * | 8/1990 | Stadtfeld | 324/207.22 |
| 5,591,996 A | * | 1/1997 | Haigh et al. | 257/238 |
| 5,801,462 A | * | 9/1998 | Yagoto et al. | 310/12 |
| 5,841,275 A | * | 11/1998 | Spies | 324/207.21 |
| 5,844,143 A | * | 12/1998 | Tomita | 73/861.12 |
| 5,913,091 A | * | 6/1999 | Nanba et al. | 399/32 |
| 6,222,181 B1 | * | 4/2001 | Ichigaya | 250/231.13 |
| 6,332,278 B1 | * | 12/2001 | Bezinge et al. | 33/784 |
| 6,353,219 B1 | * | 3/2002 | Kley | 250/234 |
| 6,861,648 B2 | * | 3/2005 | Kley | 250/306 |
| 2001/0054851 A1 | * | 12/2001 | Tsuboi et al. | 310/12 |
| 2004/0140793 A1 | * | 7/2004 | Rodi | 324/76.77 |
| 2008/0067332 A1 | * | 3/2008 | McAdam | 250/231.13 |

\* cited by examiner

*Primary Examiner*—Joseph Waks
(74) *Attorney, Agent, or Firm*—Banger Shia

(57) ABSTRACT

A power-generating magnetic sensing equipment comprises a magnetic sensing read head and a magnetic scale. The magnetic sensing read head includes a power-generating device and a signal sensing control device. The magnetic sensing read head moves with respect to the magnetic scale to make the power-generating device produce changes of magnetic field to induce the electric current, so that the power-generating device is able to continuously supply the power to the signal sensing control device, thus keeping the signal transmission uninterrupted.

5 Claims, 4 Drawing Sheets

# POWER-GENERATING MAGNETIC SENSING EQUIPMENT

BACKGROUND OF THE INVENTION

1. Field of the Invention

The present invention relates to a magnetic sensing equipment, and more particularly to a power-generating magnetic sensing equipment.

2. Description of the Prior Art

Conventional precision measurement is performed by use of the vernier caliper and the micrometer, or the block gauge, height gauge etc, are used on the platform to perform the displacement measurement. However, with the development of technology, in order to achieve the accuracy of displacement, generally, the existing machine is equipped with a magnetic sensing equipment 10 which includes a magnetic scale 11 and a magnetic sensing read head 12 (as shown in FIG. 1). The magnetic sensing read head 12 of the magnetic sensing equipment 10 must be connected with a battery 13 to obtain working power supply. When in actual use, the magnetic sensing equipment 10 has the following disadvantages:

1. When the magnetic sensing read head 12 endlessly moves to perform the sensing operation and outputs the signals, the power of the battery 13 will be continuously consumed until empty, so that the magnetic sensing read head 12 will stop working due to lack of power, thus affecting the machining accuracy;

2. The battery 13 must be frequently replaced for its limited service life, thus not only increasing the material cost, but increasing the waste treatment cost caused by a special treatment to the waste battery.

The present invention has arisen to mitigate and/or obviate the afore-described disadvantages.

SUMMARY OF THE INVENTION

The primary objective of the present invention is to provide a power-generating magnetic sensing equipment which is capable of self-generating power supply to keep the signal transmission uninterrupted.

In order to achieve the abovementioned objective, the power-generating magnetic sensing equipment comprises a magnetic sensing read head and a magnetic scale. The magnetic sensing read head includes a power-generating device and a signal sensing control device that are electrically connected to each other. The magnetic scale includes a plurality of magnets to form a magnetic induction path. The power-generating device moves with respect to the magnetic scale to produce changes of magnetic field for inducing electric current, so that the power-generating device is able to continuously supply to power to the signal sensing control device to sense and output signals. Thereby, the power-generating magnetic sensing equipment of the present invention has the following advantages:

1. The magnetic sensing read head continuously moves with respect to the magnetic scale to make the power-generating device continuously supply power to the signal sensing control device without worrying about the using up of the battery, so as to keep the signal sensing control device sensing and outputting the signals for obtaining exact data to improve the machining accuracy;

2. Since the power-generating device continuously supplies the power to the signal sensing control device, it is unnecessary to frequently replace the battery, thus not only reducing the material cost of the rechargeable elements, but reducing the cost of environmental pollution treatment.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
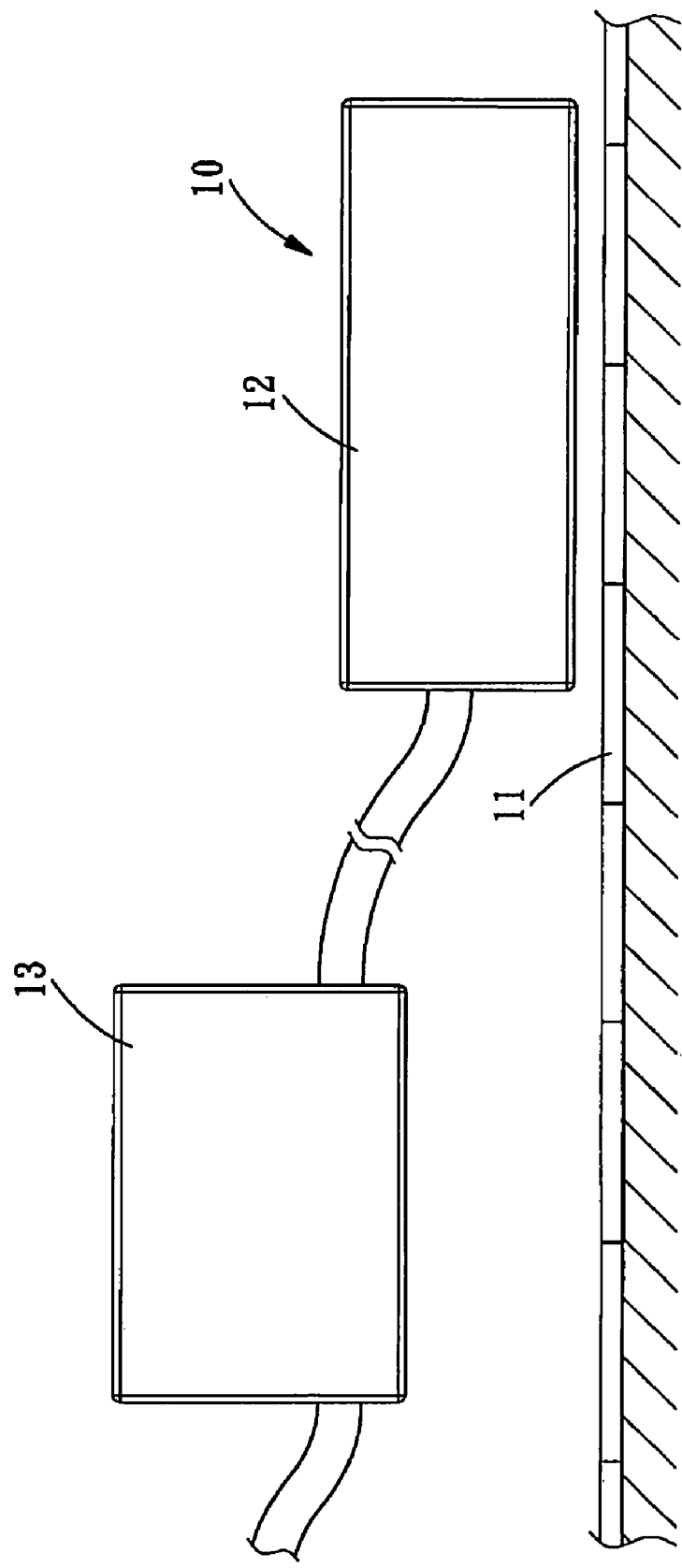
FIG. 1 is a plan view of a conventional magnetic sensing equipment.
Figure 2:
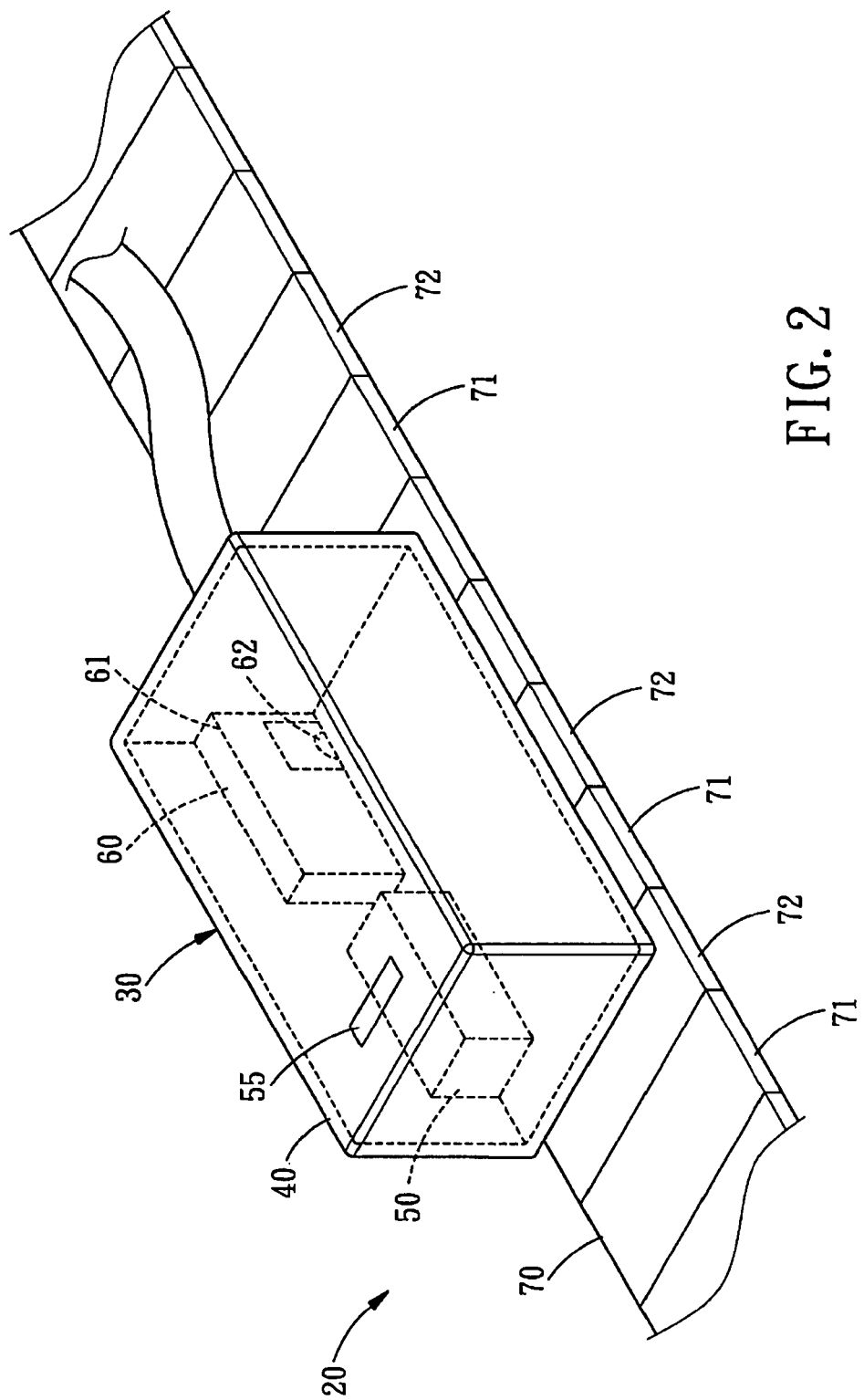
FIG. 2 is a perspective view of a power-generating magnetic sensing equipment in accordance with the present invention.
Figure 3:
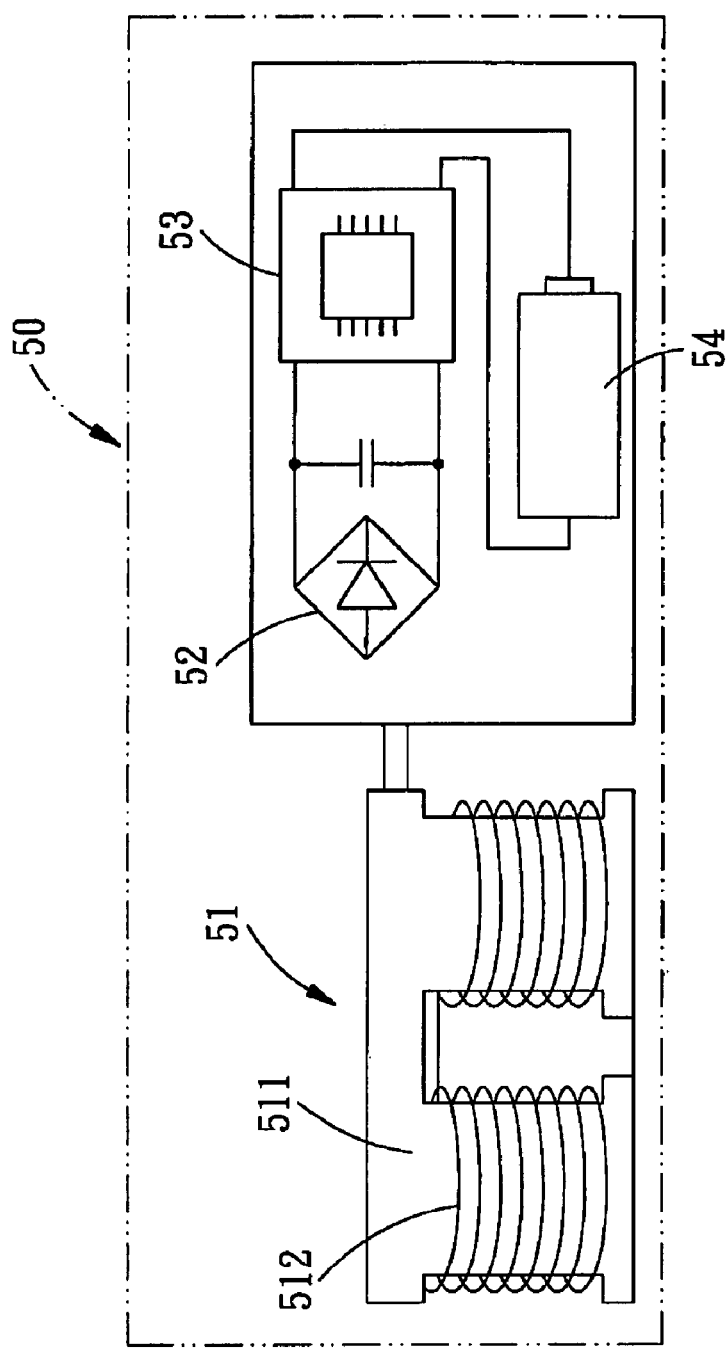
FIG. 3 is a plan view of a power-generating device in accordance with the present invention.
Figure 4:
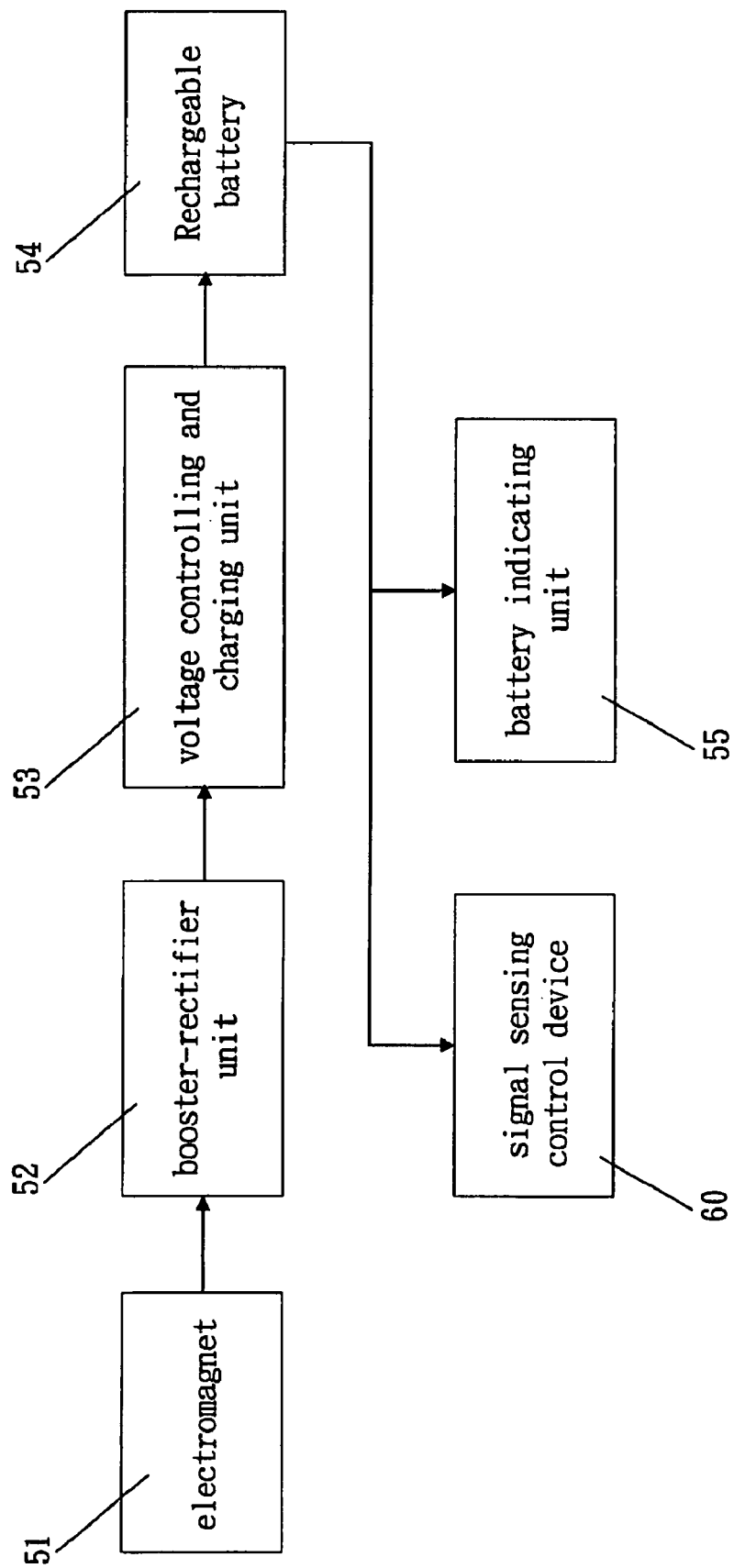
FIG. 4 is a system diagram of the power-generating magnetic sensing equipment in accordance with the present invention.

Referring to FIGS. 2-4, a magnetic sensing equipment 20 in accordance with a preferred embodiment of the present invention comprises a magnetic sensing read head 30 and a magnetic scale 70.

The magnetic sensing read head 30 includes a housing 40. A power generating device 50 and a signal sensing control device 60 are adjacently disposed in a space defined in the housing 40.

The power-generating device 50 includes an electromagnet 51, a booster-rectifier unit 52, a voltage controlling and charging unit 53, a rechargeable battery 54 and a battery indicating unit 55. The electromagnet 51 is made of a plurality of silicon-steel plates 511 and a plurality of coils 512. The silicon-steel plate 511 is made of metal material, and the coils 512 are wound around the silicon-steel plates 511. The booster-rectifier unit 52 is electrically connected to the coils 512 of the electromagnet 51 and the voltage controlling and charging unit 53, respectively. The voltage controlling and charging unit 53 is electrically connected to the rechargeable battery 54. The battery indicating unit 55 is electrically connected to the rechargeable battery 54 and installed on the top surface of the housing 40.

The signal sensing control device 60 includes a signal controller 61 with a sensor 62. The signal controller 61 is electrically connected to the rechargeable battery 54 of the power-generating device 50.

The magnetic scale 70 includes a plurality of an N-pole magnets and a plurality of S-pole magnets that are alternately connected to form a magnetic induction path. The electromagnet 51 of the power-generating device 50 and the sensor 62 of the signal sensing control device 60 move with respect to the magnetic induction path of the magnetic scale 70 to do magnetic induction.

The magnetic sensing equipment 20 is installed on a movable device.

The aforementioned is the summary of the positional and structural relationship of the respective components of the preferred embodiment in accordance with the present invention.

For a better understanding of the present invention, its operation and function, reference should be made to FIGS. 2-4:

When in use, the magnetic sensing read head 30 of the magnetic sensing equipment 20 is driven to move by the movable device with respect to the magnetic induction path of the magnetic scale 70. When the magnetic sensing read head 30 moves with respect to the magnetic scale 70, the silicon-steel plates 511 of the electromagnet 51 of the power-generating device 50 moves with respect to the N-pole magnets 71 and the S-pole magnets 72 of the magnetic scale 70, but the premise is that the magnetic sensing read head 30 of the magnetic sensing equipment 20 must continuously move with respect to the magnetic scale 70. Base on the theory that like magnetic poles repel each other and unlike magnetic poles attract each other, it will cause the magnetic field changes, so that the coils 512 will produce electric current by the magnetic induction, and then the electric current will be transmitted form the coils 512 to the booster-rectifier unit 52 and the voltage controlling and charging unit 53 of the power-generating device 50 successively, and finally transmitted to the rechargeable battery 54 for recharging.

After that, the rechargeable battery 54 will supply the power to the signal sensing control device 60 to make the sensor 62 and the signal controller 61 receive the continuous power for keeping the sensor 62 sensing signals and the signal controller 61 outputting signals. The user can monitor the battery level through the battery indicating unit 55, thus facilitating the user checking the battery level of the rechargeable battery 54 of the power-generating device 50.

To summarize, the power-generating magnetic sensing equipment comprises a magnetic sensing read head and a magnetic scale. The magnetic sensing read head includes a power-generating device and a signal sensing control device. The magnetic sensing read head moves with respect to magnetic scale to make the power-generating device produce the changes of the magnetic field with respect to the magnetic scale to induce electric current, so that the power-generating device is able to continuously supply power to the signal sensing control device.

While we have shown and described various embodiments in accordance with the present invention, it is clear to those skilled in the art that further embodiments may be made without departing from the scope of the present invention.

What is claimed is:

1. A power-generating magnetic sensing equipment comprising: a magnetic sensing read head and a magnetic scale, the magnetic sensing read head moving with respect to the magnetic scale; wherein:

the magnetic sensing read head includes a power-generating device and a signal sensing control device which is electrically connected to the power-generating device; and the magnetic scale includes a plurality of magnets to form a magnetic induction path, the power-generating device moves with respect to the magnetic scale to make the power-generating device produce magnetic field changes to induce electric current, so that the power-generating device is able to offer the uninterruptible power supply to the signal sensing control device to sense and output signal.

2. The power-generating magnetic sensing equipment as claimed in claim 1, wherein the magnetic sensing read head further includes a housing, the power generating device and the signal sensing control device are disposed in a space defined in the housing.

3. The power-generating magnetic sensing equipment as claimed in claim 1, wherein the power-generating device includes an electromagnet, a booster-rectifier unit, a voltage controlling and charging unit, a rechargeable battery and a battery indicating unit, the electromagnet is made of a plurality of silicon-steel plates and a plurality of coils, the silicon-steel plate is made of metal material, and the coils are wound around the silicon-steel plates, the booster-rectifier unit is electrically connected to the coils of the electromagnet and the voltage controlling and the voltage controlling and charging unit 53, respectively, and the voltage controlling and charging unit is electrically connected to the rechargeable battery.

4. The power-generating magnetic sensing equipment as claimed in claim 1, wherein the power-generating device further includes a battery indicating unit which is electrically connected to the rechargeable battery and installed on the housing.

5. The power-generating magnetic sensing equipment as claimed in claim 1, wherein the magnetic scale includes a plurality of N-pole magnets and a plurality of S-pole magnets that are alternately connected to form a magnetic induction path.

* * * * *